Feb. 28, 1956     J. F. FEENEY     2,736,315
HYPODERMIC SYRINGE PISTON AND ACTUATING-STEM ASSEMBLY
Filed March 23, 1954
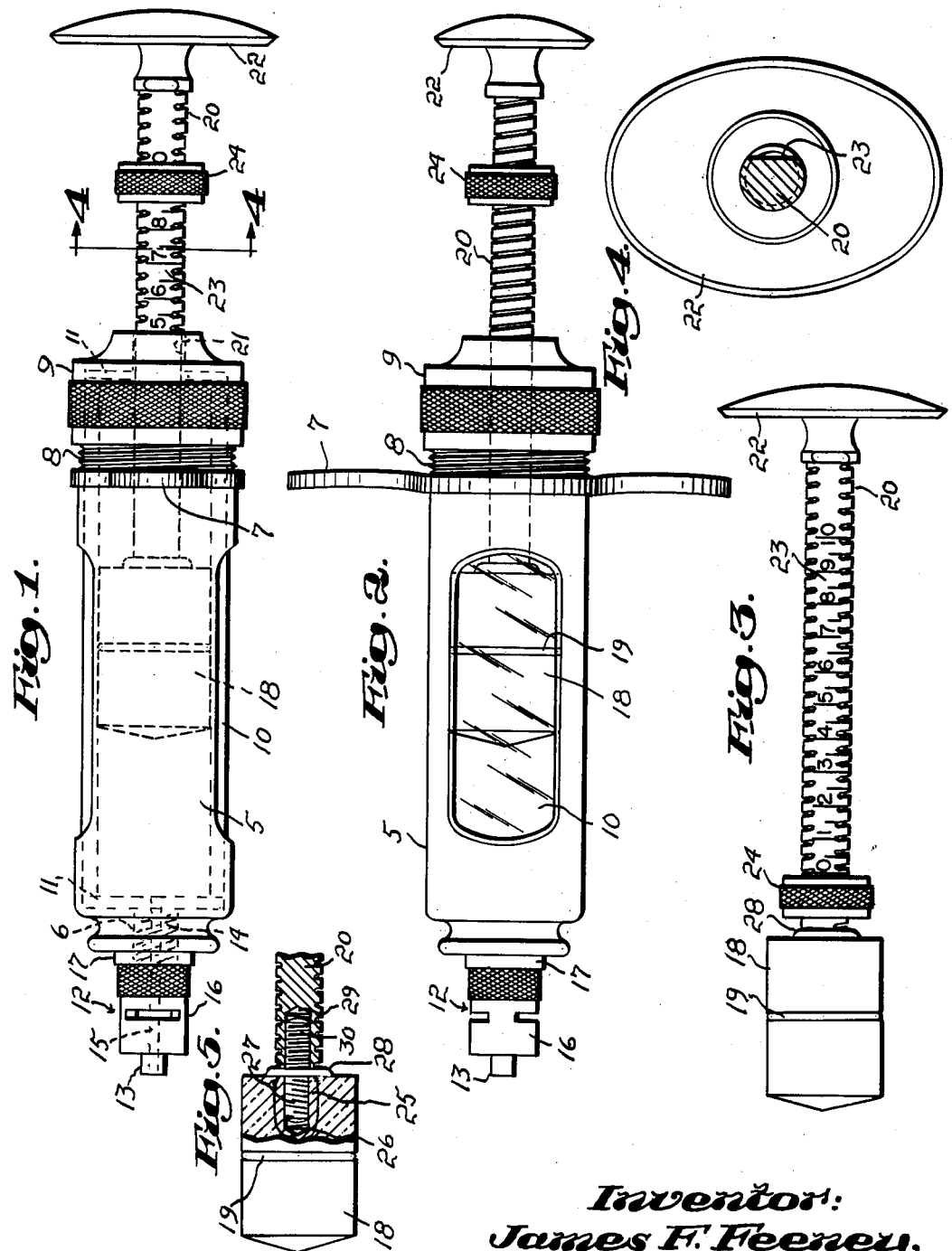
Inventor:
James F. Feeney,
by Albert Spun
Attorney

United States Patent Office 2,736,315
Patented Feb. 28, 1956

2,736,315

HYPODERMIC SYRINGE PISTON AND ACTUATING STEM ASSEMBLY

James F. Feeney, Methuen, Mass.

Application March 23, 1954, Serial No. 418,087

3 Claims. (Cl. 128—218)

This invention relates to the connection between hypodermic syringe pistons and their actuating stems.

A type of syringe widely used by veterinarians has the actuating stem detachably secured to the piston and on it is threaded a nut to be adjustable with reference to an axially disposed series of graduations on the stem and serving as a stop to limit the stroke of the piston to that required to discharge that volume of liquid that is represented by the selected graduation.

One objection to that type of syringe was that the delivered volume could not be accurately predetermined. One reason for this was that the piston and barrel of each syringe had to be fitted together while the graduations on the stem were established before its assembly with the piston. The fitting of each piston to its barrel resulted in appreciable variation in the volume of syringes of the same supposed capacity and made interchangeability of barrels and pistons impossible.

This objection has been overcome by the manufacture of glass tubing with such closely held inside diameter that syringe barrels may be made interchangeable and by the use of ceramic plungers, whose outside diameters are so uniform as to make them interchangeable in barrels made from such tubing.

With interchangeable barrels and pistons, however, the problem in accurately delivering predetermined dosages, is one of interconnecting the pistons and stems so that the graduations on the stem will be, in all syringes of the same type and capacity, uniformly disposed with respect to the piston. It will be appreciated that a slight variation in the spacing between the piston and the graduations on the stem that is proximate thereto would represent a source of inaccuracy and it is to the avoidance of inaccuracy from this cause that is the general objective of this invention.

In accordance with the invention, the rear end of the piston has an axial cavity into which is anchored a first member projecting from one face of a flange that is seated against the rear end of the plunger. There is also a second member connected to the stem with the distal end of the stem seated against the other face of the flange. The connection between the stem and piston with the respective one of the flange members is usually threaded, with the bores being appreciably longer than the threaded parts thus to ensure that the faces of the flange will be in engagement with the proximate ends of the piston and stem.

In the accompanying drawings, there is shown an illustrative embodiment of the invention from which these and other of its novel features and advantages will be readily apparent.

In the drawings:

Fig. 1 is an elevational view of a syringe in accordance with the invention, positioned to show the measuring graduations on the operating stem.

Fig. 2 is a similar view of the syringe rotated through 90°.

Fig. 3 is an elevational view of the stem and piston.

Fig. 4 is a section taken along the indicated lines 4—4 of Fig. 1, and

Fig. 5 is a fragmentary and partly sectioned view illustrating the connection between the stem and the piston.

The syringe shown in the drawings consists of a body 5 which, as may be seen from Fig. 1, has a threaded bore 6 axially of its distal end and finger grips 7 adjacent its other end which is threaded as at 8 to receive the cap 9. A length of glass tubing 10 within the body 5 is held tightly clamped between washers 11 when the cap 9 is secured to the body 5, thus to establish the barrel.

Generally indicated at 12 is a unit enabling a needle to be detachably secured to the syringe. The device 12 includes a tip 13 tapered for entry into the correspondingly tapered recess in the needle hub and a stem 14 threaded for entry into the body bore 6. An axial bore 15 extends through the tip 13 and stem 14 and the unit 12 is shown as also having a conventional locking sleeve 16 against which the washer 17 is compressed when the device 12 is tightly secured to the body 5.

The piston 18 is shown as made from ceramic material having approximately the same coefficient of expansion as that of the glass tubing 10 and is formed intermediate its ends with an annular groove in which is mounted a spring 19 providing means frictionally holding the piston 18 in the barrel. A stem 20 extends through the axial bore 21 in the cap 9 and has a head 22. As will be apparent from the drawings, the stem 20 is threaded and has a flattened portion 23 on which graduations are contrastingly marked. Threaded on the stem 20, between the cap 9 and the head 22, is a nut 24 which has the function of being quickly adjustable in relation to the graduations and then serving as a stop engageable with the promixate end of the cap 9 to limit the stroke of the piston to the extent required to discharge that volume of liquid represented by the selected one of the graduations, thus delivering accurately the exact dosage indicated for each administration.

Reference is now made to the connection between the piston 18 and the stem 20 and attention is particularly directed to Fig. 5. Since the graduations on the stem 20 are established before the syringe is assembled, the accuracy of the syringe depends on the stem and piston being exactly united.

To accomplish this result, the rear end of the piston 18 is formed with a recessed axial cavity, usually of rectangular cross section, in which there is shown a cast metal anchor 25 bored and tapped as at 26 to receive the threaded stem 27 protruding from one face of the adapter flange 28. The distal end of the stem 20 is bored and tapped as at 29 to receive the threaded stem 30 which protrudes from the other face of the adapter flange 28. It will be noted that the bores 26 and 29 are of substantially greater length than the threaded stems that are to be threaded therein, thus to ensure that one face of the adapter flange will seat against the rear face of the piston 18 and that the distal end of the stem 20 will seat against the opposite face of the adapter flange. When this relationship exists between the piston 18 and its stem 20, the graduations become accurate measures of volume so that accurate fluid delivery in any syringe of the same capacity is ensured. In addition, faulty assembly or parts that are defective resulting in the faces of the adapter flange not engaging the proximate ends of the piston and stem are readily detected on even a casual inspection.

What I therefore claim and desire to secure by Letters Patent is:

1. In a veterinary syringe and the like, a glass barrel, a piston of ceramic material having a coefficient of expansion substantially equal to that of the glass and an axial cavity in its rear face, an anchor lodged in said cavity and having an axial bore, a stem having axially spaced dosage measuring graduations and a threaded bore in its distal end, and an adapter including a flange and oppositely disposed threaded parts in respective ones of said bores, said bores and threaded portions being proportioned to bring one face of said flange into engagement with the rear face of the piston and the distal end of said stem into engagement with the other face of said flange.

2. In a veterinary syringe and the like, a glass barrel, a piston of ceramic material having a coefficient of expansion substantially equal to that of the glass and an axial cavity in its rear face, an anchor lodged in said cavity and having an axial bore, a stem having axially spaced dosage measuring graduations and a threaded bore in its distal end, and an adapter including a portion threaded in said anchor bore, a portion threaded into said stem bore and a flange between said portions having one surface in engagement with the rear face of the piston and its other surface engaged by the distal end of said stem, the length of each adapter portion being less than the depth of the bore that it is to enter.

3. In a veterinary syringe and the like, a glass barrel, a piston of ceramic material having a coefficient of expansion substantially equal to that of the glass and an axial cavity in its rear face, an anchor in said cavity having a threaded bore, a stem having axially spaced dosage measuring graduations, an adapter including a portion threaded in said anchor bore but whose length is less than the depth thereof, a flange having one surface in engagement with the rear face of the piston, and a threaded connection between said adapter and said stem whose parts are arranged and proportioned to position the distal end of said stem in engagement with the other face of said flange.

References Cited in the file of this patent

UNITED STATES PATENTS

| 2,646,798 | Brown | July 28, 1953 |

FOREIGN PATENTS

| 276,860 | Switzerland | Nov. 1, 1951 |
| 611,290 | Great Britain | Oct. 27, 1948 |